April 25, 1933.   F. HENLE ET AL   1,905,466
PROCESS OF PREPARING ACETIC ANHYDRIDE
Filed Feb. 10, 1931
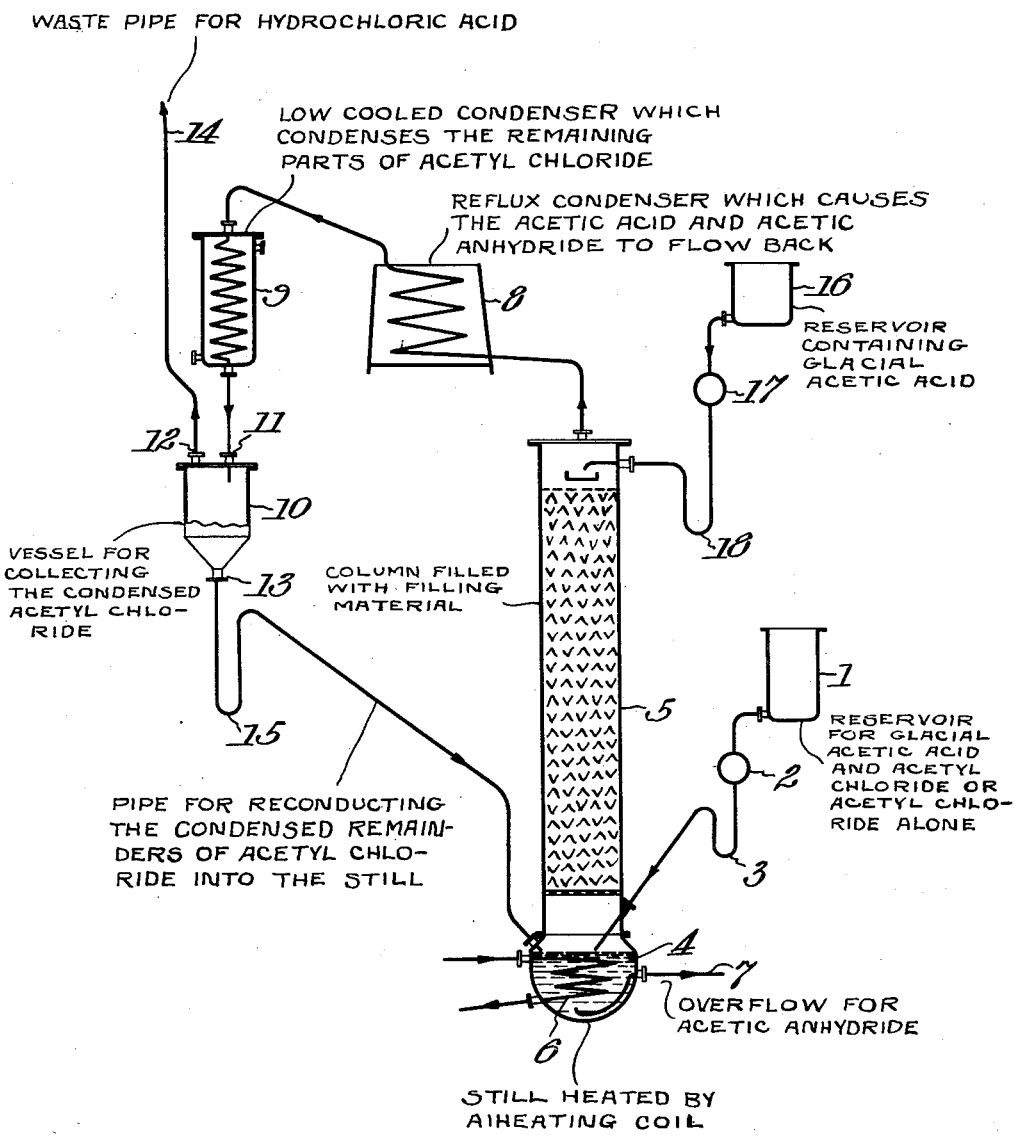

Patented Apr. 25, 1933                        1,905,466

UNITED STATES PATENT OFFICE

FRANZ HENLE, OF FRANKFORT-ON-THE-MAIN-HOCHST, GEORG MEDER, OF MUNSTER IN TAUNUS, VALENTIN LANZ, OF FRANKFORT-ON-THE-MAIN-HOCHST, AND FRANZ PRIVINSKY, OF HOFHEIM IN TAUNUS, GERMANY, ASSIGNORS TO I. G. FARBENINDUSTRIE AKTIENGESELLSCHAFT, OF FRANKFORT-ON-THE-MAIN, GERMANY

PROCESS OF PREPARING ACETIC ANHYDRIDE

Application filed February 10, 1931, Serial No. 514,816, and in Germany February 4, 1928.

The present invention relates to a process of preparing acetic anhydride.

We have found that the manufacture of acetic anhydride from glacial acetic acid and acetyl chloride or substances forming acetyl chloride can be accelerated in a surprising manner and the process can be rendered extremely productive and simultaneously continuous by causing the components to react from the beginning at a temperature near the boiling point of the acetic anhydride and in the presence of boiling acetic anhydride. The best procedure is to introduce the reaction components into a continuously acting column wherein the ascending vapor of acetic anhydride and the condensate of acetic anhydride, which flows back, i. e., the final product of the reaction itself, is always and already from the beginning present in a relative excess when compared with the uncombined components which are introduced so that the temperature of the reaction mixture is always and already from the beginning above the boiling point of the glacial acetic acid (and all the more above that of acetyl chloride). Glacial acetic acid and acetyl chloride may be introduced in the liquid or the gaseous state, in the same direction or in the counter-current to each other. For starting the continuous process there is introduced, before the addition of the reaction component into the column, such a quantity of acetic anhydride into the still provided with an overflow that the column may be heated with the vapor of acetic anhydride.

We have furthermore found that in this process it is not only possible but even very advantageous to use the components in about stoichiometric proportions, even with a small excess of acetyl chloride. If the excess of acetic acid is avoided in the present process, the continuous production of the anhydride is facilitated and accelerated because it is no longer necessary to separate large quantities of acetic acid by a fractional distillation from the anhydride. The small quantities of the starting components which have not entered into the reaction are continuously condensed after the continuous separation of the anhydride and re-introduced into the system.

Instead of acetyl chloride there may be used such substances as are capable of forming acetyl chloride from glacial acetic acid, for instance thionyl chloride. In this case there is required 1 mol. of thionyl chloride, $SOCl_2$, for 2 mols. of glacial acetic acid for the formation of the anhydride. The sulfurous anhydride which is set free escapes with the hydrogen chloride.

The process may be carried out in an apparatus as shown in the annexed drawing, the exact description of the drawing is given in the Example 1.

The following examples serve to illustrate our invention, but they are not intended to limit it thereto, the parts being by weight:

1. From a reservoir 1 a mixture of 60 parts of glacial acetic acid and 78.5 parts of acetyl chloride is introduced through a measuring apparatus 2 and a siphon 3 directly or through an evaporating pipe made of copper into the bottom part 4 of a column 5 preheated by vapor from boiling acetic anhydride. The column is filled with filling materials, such as Dr. Raschig's rings. The acetic anhydride is brought to boiling by the heating coil 6. In the column 5 the acetic anhydride which is formed continuously flows down, first into the still 4 and thence through an overflow 7 connected with a cooling device and into the receiver, while the waste gases consisting chiefly of hydrogen chloride escape at the upper part of the column 5. These waste gases pass through the reflux cooler 8 and through the strongly cooled downwardly directed condenser 9 into an intermediate vessel 10 provided with two openings 11 and 12 in the upper part and one opening 13 at the bottom. From this vessel 10 the gases pass through a waste pipe 14 and enter a trickling tower, wherein the gas is washed with a liquid which absorbs the acetyl chloride without absorbing a large quantity of hydrogen chloride. The gases then enter the absorption plant for hydrochloric acid.

The small remainders of acetyl chloride and glacial acetic acid and the small quantities of acetic anhydride carried along with the hydrogen chloride are nearly completely condensed in the low cooled condenser 9 mentioned above and are reconducted into the still 4 through the intermediate vessel 10 mentioned above and the siphon 15 which is connected with the lower opening 13 of that vessel. The crude acetic anhydride obtained in nearly a quantitative yield is of about 95 percent strength. It is purified by rectifying it. The yield and the purity of the crude product may still be somewhat increased if acetyl chloride is used in a small excess instead of the exactly calculated stoichiometric proportion, which excess is at least sufficient for compensating any loss of acetyl chloride which may occur.

2. Approximately equimolecular quantities of glacial acetic acid and acetyl chloride are continuously introduced in a counter current to each other into the column 5 which has been pre-heated by boiling acetic anhydride; the acetyl chloride is caused to enter from the reservoir 1 at the bottom part 4 of the column 5, whereas the glacial acetic acid enters from the upper reservoir 16 through a measuring apparatus 17 and a siphon 18 at the upper part of the column 5. The two components enter at the same rate as the reaction occurs. Besides, the arrangement of the device and the course of the reaction are as described in Example 1.

3. A mixture of 120 parts of glacial acetic acid and 119 parts of thionyl chloride is continuously introduced from the reservoir 1 into the bottom part 4 of the column 5 which has been pre-heated by boiling acetic anhydride; the mixture is caused to react as described in Example 1 with regard to the mixture of glacial acetic acid and acetyl chloride. The acetic anhydride which is formed flows continuously downward, while the hydrogen chloride and sulfur dioxide escape at the upper part of the column 5, pass the reflux cooler 8, the low cooled condenser 9, the intermediate vessel 11 and the waste pipe 14 whence they enter the absorption plant for hydrochloric acid. The sulfurous acid which likewise leaves the column may also be used again. The liquid parts condensed in the condenser 9 return into the still 4 through the intermediate vessel 10 and the siphon 15.

It is to be understood that in the following claims the term "acetyl chloride" is intended to comprise also products capable of yielding acetyl chloride in the presence of glacial acetic acid.

We claim:

1. In the process of preparing acetic anhydride by heating together acetyl chloride and glacial acetic acid the step which comprises causing the two components to act upon each other in about stoichiometric proportions in a continuous manner at a temperature in the neighborhood of the boiling point of acetic anhydride and in the presence of boiling acetic anhydride.

2. In the process of preparing acetic anhydride by heating together acetyl chloride and glacial acetic acid the step which comprises causing the two components in a counter current to act upon each other in about stoicchiometric proportions in a continuous manner at a temperature in the neighborhood of the boiling point of acetic anhydride and in the presence of boiling acetic anhydride.

3. In the process of preparing acetic anhydride by heating together acetyl chloride and glacial acetic acid the step which comprises causing the two components to act upon each other in about stoichiometric proportions in a continuous manner at a temperature in the neighborhood of the boiling point of acetic anhydride and in the presence of boiling acetic anhydride, subjecting the waste gases to a temperature sufficiently low to condense acetyl chloride and reconducting the condensate into the still.

4. In the process of preparing acetic anhydride by heating together acetyl chloride and glacial acetic acid the step which comprises causing the two components in a counter current to act upon each other in about stoichiometric proportions in a continuous manner at a temperature in the neighborhood of the boiling point of acetic anhydride and in the presence of boiling acetic anhydride, subjecting the waste gases to a temperature sufficiently low to condense acetyl chloride and reconducting the condensate into the still.

In testimony whereof, we affix our signatures.

FRANZ HENLE.
GEORG MEDER.
VALENTIN LANZ.
FRANZ PRIVINSKY.